United States Patent
Braun et al.

(10) Patent No.: US 6,218,495 B1
(45) Date of Patent: Apr. 17, 2001

(54) PROCESS FOR THE CONTINUOUS PREPARATION OF MOISTURE-CURING ORGANOPOLYSILOXANE COMPOSITIONS

(75) Inventors: Rudolf Braun, Kastl; Helmut Wöhrl, Altötting; Werner Trajer, Burghausen; Johann Steiner, Kirchweihdach; Thomas Felber, Burghausen, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/256,064

(22) Filed: Feb. 24, 1999

(30) Foreign Application Priority Data

Mar. 5, 1998 (DE) ............................................. 198 09 548

(51) Int. Cl.$^7$ ............................ L08G 77/06; L08G 77/16
(52) U.S. Cl. .............................. 528/14; 528/15; 528/17; 528/18; 528/19; 528/21; 528/34; 528/901; 524/860; 524/448; 524/401; 524/403; 524/430; 524/431; 524/423; 524/425; 524/588; 525/100
(58) Field of Search ................................. 524/860, 448, 524/401, 403, 430, 431, 423, 425, 588; 525/100; 528/14, 15, 17, 18, 19, 21, 34, 901

(56) References Cited

U.S. PATENT DOCUMENTS 5,789,480 * 8/1998 Adachi et al. ....................... 524/863
6,031,026 * 2/2000 Tateyama et al. ................... 523/340

FOREIGN PATENT DOCUMENTS

| 1 252 939 | 4/1989 | (CA) . |
|---|---|---|
| 41 03 602 A2 | 8/1992 | (DE) . |
| 0 234 226 A2 | 9/1987 | (EP) . |
| 0 234 226 | 4/1992 | (EP) . |
| 1174219 | 12/1969 | (GB) . |

OTHER PUBLICATIONS

Derwent Abstract corr. to EP 0234226 (AN 87–206958).
Derwent Abstract corr. to DE 4103602 (AN 92–277301).

* cited by examiner

Primary Examiner—Robert Dawson
Assistant Examiner—Jeffrey B. Robertson
(74) Attorney, Agent, or Firm—Brooks & Kushman P.C.

(57) ABSTRACT

A three-stage process for the continuous preparation of RTV-1 compositions comprises, in a first step, preparing a raw mixture of α,ω-dihydroxypolydiorganosiloxane, filler and, if desired, further constituents, in a second step, freeing the raw mixture of gas inclusions under reduced pressure and, if desired, mixing it with further constituents and, in a third step, mixing the degassed raw mixture with a crosslinker, a condensation catalyst and, if desired, additional constituents not yet added in the first and second steps.

14 Claims, 4 Drawing Sheets

PROCESS FOR THE CONTINUOUS PREPARATION OF MOISTURE-CURING ORGANOPOLYSILOXANE COMPOSITIONS

TECHNICAL FIELD

The invention relates to a three-stage process for the continuous preparation of RTV-1 compositions.

BACKGROUND ART

One component organopolysiloxane compositions which can be stored with exclusion of moisture and crosslink at room temperature on admission of moisture, known as RTV-1 compositions, have been known for a long time.

In the preparation of the RTV-1 compositions, not all constituents can be added in one step; rather, after mixing part of the constituents, a certain reaction time is necessary before further constituents are mixed in. Two-stage processes have been developed for this purpose. For example, in EP-A-234 226, part of the constituents are combined in a first step in a continuous closed mixer, and in a second step in a reciprocating kneader, the remaining constituents are metered in and the composition is homogenized and degassed under reduced pressure in this kneader.

RTV-1 compositions are compounded to form many different products for various applications which differ, for example, in terms of color, transparency or viscosity. In the process of EP-A-234 226, when the product is changed, for example in the case of a color change, the entire reciprocating kneader has to be cleaned or at least generously purged with the composition according to the changed formulation. This is associated with large product losses.

DISCLOSURE OF INVENTION

It is an object of the invention to provide a process for the continuous preparation of RTV-1 compositions in which a change of formulation results in only small losses of time and of RTV-1 composition.

DESCRIPTION OF THE PREFERRED EMBODIMENTS

Figure 1:
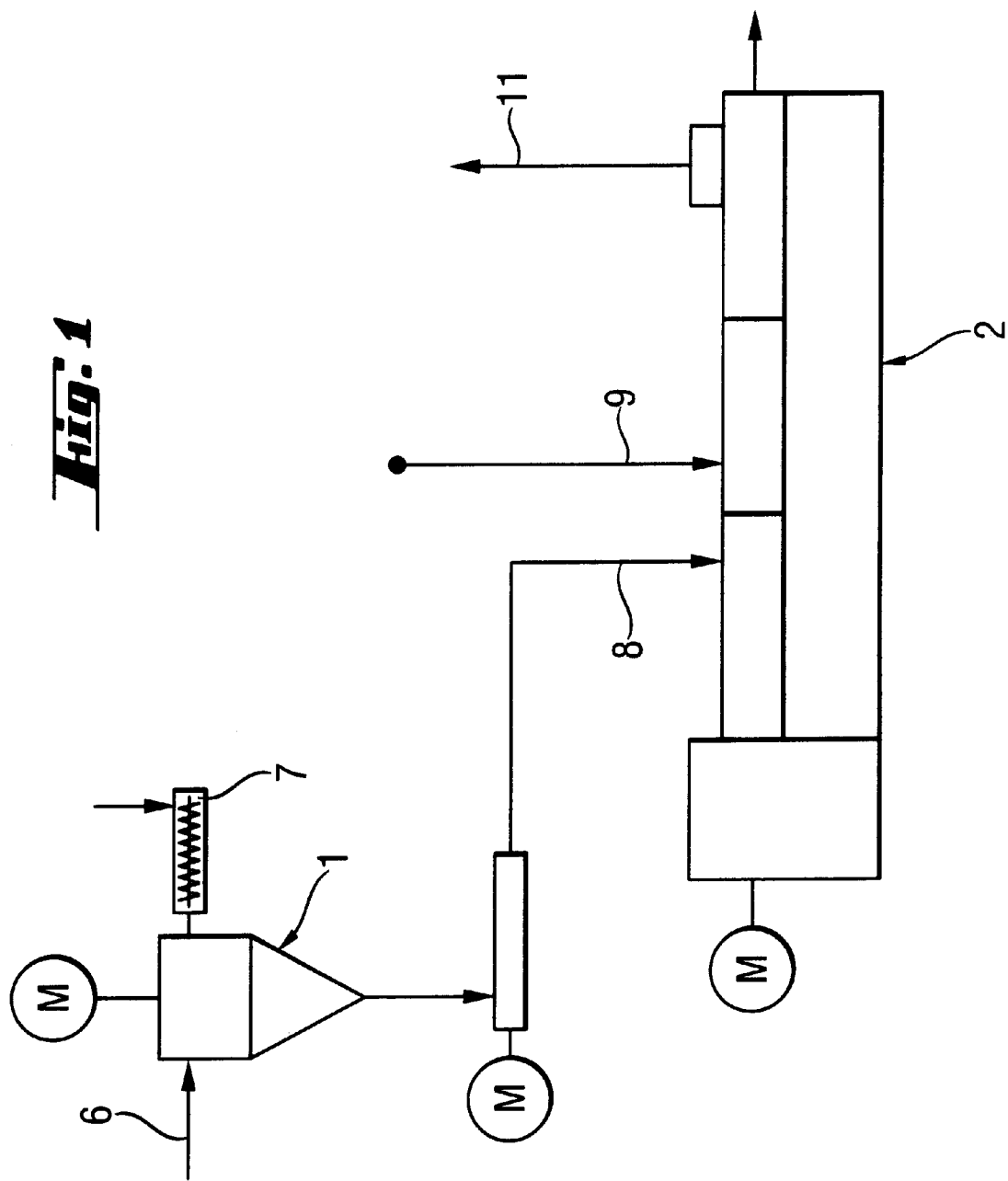
FIG. 1 Process equipment diagram (not according to the invention): Mixing turbine (1)/reciprocating single-screw kneader (2)

The invention provides a three-stage process for the continuous preparation of RTV-1 compositions, which comprises, in a first step, preparing a raw mixture of α,ω-dihydroxypolydiorganosiloxane, filler and, if desired, further constituents, in a second step, freeing the new mixture of gas inclusions under reduced pressure and, if desired, mixing it with further constituents and, in a third step, mixing the degassed raw mixture with a crosslinker, a condensation catalyst and, if desired, additional constituents not yet added in the first and second steps.

The invention is based on the recognition that the degassing step does not necessarily have to be carried out after all constituents have been mixed, but can be brought forward to a point after mixing α,ω-dihydroxypolydiorganosiloxane and filler. The product quality obtained is just as good as when degassing is carried out after all constituents have been mixed. The third step can therefore make use of simple mixing apparatuses which have a low volume and are easy to clean by purging.

The α,ω-dihydroxypolydiorganosiloxane preferably has the formula (I)

$$\text{HO—[R}_2\text{SiO]}_m\text{—H} \qquad (I),$$

where

R are monovalent $C_1$–$C_8$-hydrocarbon radicals which may be substituted by fluoro, chloro, bromo, $C_1$–$C_4$-alkoxyalkyl or cyano groups and m has a value such that the α,ω-dihydroxypolydiorganosiloxane has a viscosity of from 0.05 to 1000 Pa·s.

Examples of hydrocarbon radicals R are linear and cyclic saturated and unsaturated alkyl radicals such as the methyl radical; aryl radicals such as the phenyl radical, alkaryl radicals such as tolyl radicals; and aralkyl radicals such as the benzyl radical.

Preferred radicals R are unsubstituted hydrocarbon radicals having from 1 to 6 carbon atoms, with particular preference being given to the methyl radical.

The α,ω-dihydroxypolydiorganosiloxanes preferably have a viscosity of from 100 to 700,000 mPa·s, in particular from 20,000 to 350,000 mPa·s, in each case measured at 23° C.

Examples of fillers which are mixed into the RTV-1 compositions are non-reinforcing fillers, i.e. fillers having a BET surface area of up to 50 m²/g, e.g. quartz, chalk, diatomaceous earth, calcium silicate, zirconium silicate, zeolites, metal oxide powders such as aluminum, titanium, iron and zinc oxides or their mixed oxides, barium sulfate, calcium carbonate, gypsum, silicon nitride, silicon carbide, boron nitride, glass powder and polymer powder, e.g. polyacrylonitrile powder; reinforcing fillers, i.e. fillers having a BET surface area of more than 50 m²/g, e.g. pyrogenic silica, precipitated silica, carbon black such as furnace black and acetylene black and silicon-aluminum mixed oxides of high BET surface area; and fibrous fillers such as asbestos or synthetic fibers.

The fillers mentioned can be hydrophobicized, for example by treatment with organosilanes, with organosiloxanes, with stearic acid, or by etherification of hydroxyl groups to form alkoxy groups. It is possible to use one type of filler, but mixtures of two or more fillers can also be used.

As crosslinkers, preference is given to using silanes having groups which can be condensed with the hydroxyl groups of the α,ω-dihydroxypolydiorganosiloxane, and also oligomeric condensation products of these silanes. Crosslinkers used are particularly preferably silanes of the formula (II)

$$R^1{}_n\text{SiX}_{(4-n)} \qquad (II),$$

where $R^1$ are monovalent $C_1$–$C_{10}$-hydrocarbon radicals which may be substituted by fluoro, chloro, bromo, $C_1$–$C_4$- alkoxyalkyl, amino-$C_1$–$C_6$-alkyl, amino-$C_1$–$C_6$-alkylenamino or cyano groups, X are hydrogen, fluorine, chlorine or bromine atoms, $C_1$–$C_4$-alkoxy, $C_1$–$C_4$-acyloxy, amino, $C_1$–$C_4$-alkylamino, $C_1$–$C_4$-dialkylamino, $C_1$–$C_6$-alkylamido, (N—$C_1$—$C_4$-alkyl)-$C_1$–$C_6$-alkylamido or Si—O—N≡-bonded $C_3$–$C_6$-ketoximo groups and n is 0, 1 or 2.

Examples of condensation catalysts which accelerate the condensation of the crosslinker with the α,ω-dihydroxypolydiorganosiloxane are amines, organic compounds of tin, zinc, zirconium, titanium and aluminum. Among these condensation catalysts, preference is given to butyl titanates and organic tin compounds such as di-n-butyltin diacetate, di-n-butyltin dilaurate and reaction products of a silane having, per molecule, at least two monovalent hydrocarbon radicals acting as hydrolyzable groups which are bound to silicon via oxygen and may be substituted by an alkoxy group, or an oligomer of this silane, with a diorganotin diacylate, where all valences of the tin atoms in these reaction products are occupied by oxygen atoms of the group ≡SiOSn≡ or by SnC-bonded, monovalent organic radicals.

In the preparation of the RTV-1 compositions, it is possible to use additional constituents, for example coloring constituents such as pigments and soluble dyes; fragrances; plasticizers such as trimethylsiloxy-terminated dimethylpolysiloxanes which are liquid at room temperature, or organic plasticizers; fungicides; resin-like organopolysiloxanes including those comprising $(CH_3)_3SiO_{1/2}$ and $SiO_{4/2}$ units; purely organic resins such as homopolymers or copolymers of acrylonitrile, styrene, vinyl chloride or propylene, where such purely organic resins, in particular copolymers of styrene and n-butylacrylate, can have been produced by polymerization of the monomers mentioned by means of free radicals in the presence of a diorganopolysiloxane having an Si-bonded hydroxy group in each of the end units; corrosion inhibitors; polyglycols which may be esterified and/or etherified; oxidation inhibitors; heat stabilizers; solvents; materials for influencing the electrical properties, e.g. conductive carbon black; flame retardants; light stabilizers; and agents for extending the skin formation time, e.g. silanes having SiC-bonded mercaptoalkyl radicals; and cell-generating agents, e.g. azodicarbonamide. Likewise, it is possible to add coupling agents, preferably amino-functional silanes.

Suitable mixers for preparing the raw mixture in the first step are continuous closed mechanical mixers, in particular a mixing turbine through which material flows axially or kneaders such as single- or twin-screw kneaders, for example reciprocating kneaders. If a kneader is used, it does not have to have a venting facility such as vacuum points.

Suitable mixers for the second step are preferably the kneaders as described for the first step, but which have a venting facility and are operated under reduced pressure, or contain degassing apparatuses. The internal pressure is preferably not more than 10 kPa.

Suitable mixers in the third step are preferably static mixers and dynamic mechanical mixers.

The first step can be divided into two or more sub-steps. For example, a premix of α,ω-dihydroxypolydiorganosiloxane, crosslinker and plasticizer can be prepared in a first mixer and then be mixed with filler in a second mixer to produce the raw mixture. The raw mixture can also be prepared by metering the constituents α,ω-dihydroxypolydiorganosiloxane and filler and also further constituents into the mixer at various points.

The first and second steps can also be carried out in succession in a mixer having a relatively long construction. For example, the raw mixture can be prepared in the front region of a screw kneader and then be degassed under reduced pressure in the downstream region of the kneader.

In the second step, nonvolatile constituents, for example a metal salt, can be mixed in as condensation catalyst during degassing.

In the third step, coupling agents and, if desired, coloring constituents and also either crosslinker or catalyst which is still absent are preferably mixed in.

In the examples described below, all percentages are by weight unless otherwise specified. Furthermore, all viscosities are at a temperature of 25° C.

The examples were carried out in process equipments corresponding to process equipment diagrams shown in FIGS. 1 to 4. In the drawings, M stands for motor.

COMPARATIVE EXAMPLE 1a

Process Equipment Diagram Shown in FIG. 1

730 kg/h of a mixture of 71% of an α,ω-dihydroxypolydimethylsiloxane (viscosity 80,000 $mm^2/s$), 23.5% of an α,ω-bis(trimethylsiloxy)polydimethylsiloxane (viscosity 100 $mm^2/s$) and 5.5% of a mixture of oligomeric acetoxysilanes (crosslinker ES 24 from Wacker-Chemie GmbH, Munich) are metered into the mixing turbine (1) via the inlets (6). In addition, 62 kg/h of a pyrogenic silica (BET surface area 150 $m^2/g$) are metered into the mixing turbine (1) via a screw (7). The mixing turbine (1) is operated at a rotational speed of 1400 rpm.

The raw mixture is transferred to the reciprocating single-screw kneader (2) via inlet (8). There, 0.08 kg/h of an Sn catalyst (catalyst SK from Wacker-Chemie GmbH, Munich) is metered in via inlet (9) and 16 kg/h of a 50% strength paste of carbon black in silicone oil are metered in via inlet (10). Gases are taken off from the RTV-1 composition via the port (11).

The RTV-1 composition obtained has stable properties and displays color parameters according to the CIE-Lab system of L*: 22, a*: 0.0 and b*: −0.3.

COMPARATIVE EXAMPLE 1b

Process Equipment Diagram Shown in FIG. 1

As in Comparative Example 1a, a raw mixture is prepared in the mixing turbine (1) and transferred into the reciprocating single-screw kneader (2) via inlet (8). There, 0.08 kg/h of an Sn catalyst (catalyst SK from Wacker-Chemie GmbH, Munich) is metered in via inlet (9) and 24 kg/h of a 50% strength paste of titanium dioxide in silicone oil are metered in via inlet (10). Gases are taken off from the RTV-1 composition via the port (11).

The RTV-1 composition obtained has stable properties and displays color parameters according to CIE-Lab system of L*: 96.5, a*: −0.5 and b*: 1.0.

COMPARATIVE EXAMPLE 1c

Process Equipment Diagram Shown in FIG. 1

Firstly, a black RTV-1 composition is prepared as described in Comparative Example 1a. A change is then made directly to the formulation of Comparative Example 1b. After 8 hours, the test is stopped since the white RTV-1 composition still has black streaks. To obtain a pure white RTV-1 composition, it is necessary to clean the process equipment.

EXAMPLE 2a

Figure 2:
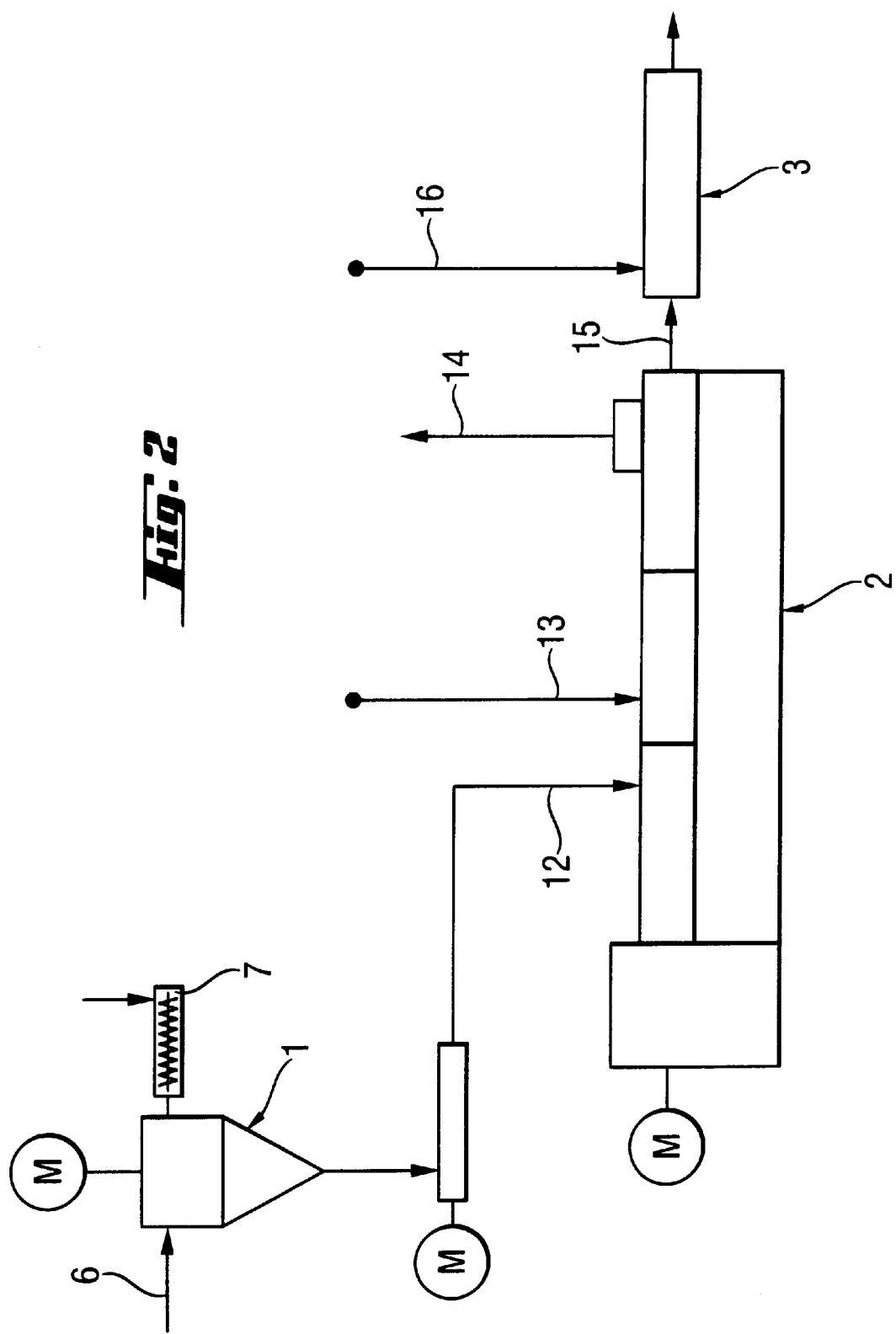
FIG. 2 Process equipment diagram (according to the invention): Mixing turbine (1)/reciprocating single-screw kneader (2)/static mixer (3)

Process Equipment Diagram Shown in FIG. 2

730 kg/h of a mixture of 71% of an α,ω-dihydroxypolydimethylsiloxane (viscosity 80,000 $mm^2/s$), 23.5% of an α,ω-bis(trimethylsiloxy)polydimethyl-siloxane (viscosity 100 mm$^2$/s) and 5.5% of a mixture of oligomeric acetoxysilane (crosslinker ES 24 from Wacker-Chemie GmbH, Munich) are metered into the mixing turbine (1) via the inlets (6). In addition, 62 kg/h of a pyrogenic silica (BET surface area 150 m$^2$/g) are metered into the mixing turbine (1) via a screw (7). The mixing turbine (1) is operated at a rotational speed of 1400 rpm.

The raw mixture is transferred to the reciprocating single-screw kneader (2) via inlet (12). There, 0.08 kg/h of an Sn catalyst (catalyst SK from Wacker-Chemie GmbH, Munich) is metered in via inlet (13). Gases are taken off from the RTV-1 composition via the port (14).

The degassed raw mixture is transferred to the static mixer (3) via inlet (15). There, 16 kg/h of a 50% strength paste of carbon black in silicone oil are metered in via inlet (16).

The RTV-1 composition obtained has stable properties and displays color parameters according to the CIE-Lab system of L*: 22, a*: 0.0 and b*: −0.3.

EXAMPLE 2b
Process Equipment Diagram Shown in FIG. 2

As in Example 2a, a raw mixture is prepared in the mixing turbine (1) and the reciprocating single-screw kneader (2), degassed and transferred to the static mixer (3) via inlet (15). There, 24 kg/h of a 50% strength paste of titanium dioxide in silicone oil are metered in via inlet (16).

The RTV-1 composition obtained has stable properties and displays color parameters according to the CIE-Lab system of L*: 96.5, a*: −0.5 and b*: 1.0.

EXAMPLE 2c
Process Equipment Diagram Shown in FIG. 2

Firstly, a black RTV-1 composition is prepared as described in Example 2a. A change is then made directly to the formulation of Example 2b. After 3 hours, the RTV-1 composition has the color parameters of Example 2b.

Figure 3:
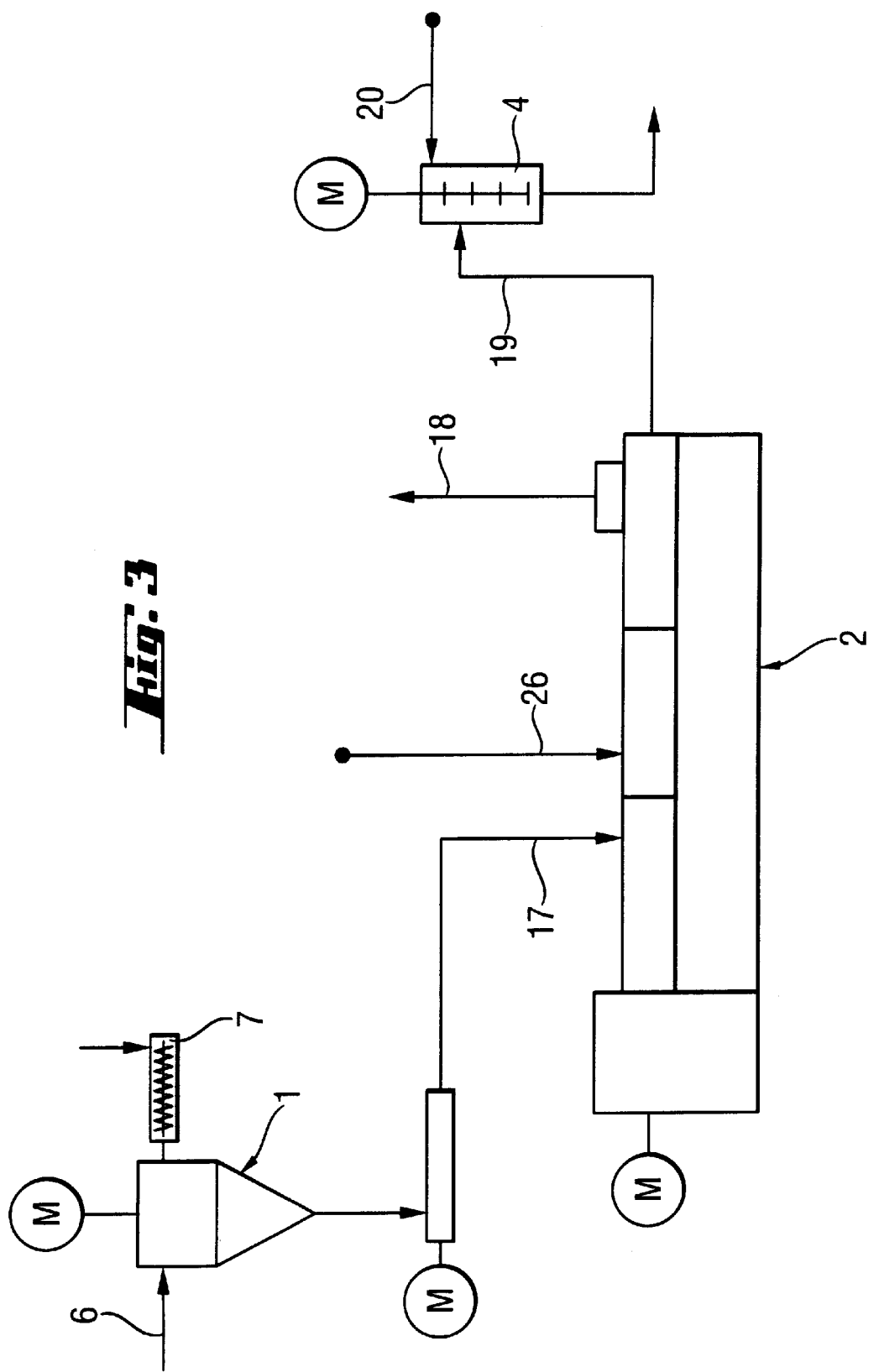
FIG. 3 Process equipment diagram (according to the invention): Mixing turbine (1)/reciprocating single-screw kneader (2)/dynamic mixer (4)

EXAMPLE 3a
Process Equipment Diagram Shown in FIG. 3

730 kg/h of a mixture of 71% of an α,ω-dihydroxypolydimethylsiloxane (viscosity 80,000 mm$^2$/s), 23.5% of an α,ω-bis(trimethylsiloxy)polydimethylsiloxane (viscosity 100 mm$^2$/s) and 5.5% of a mixture of oligomeric acetoxysilanes (crosslinker ES 24 from Wacker-Chemie GmbH, Munich) are metered into the mixing turbine (1) via the inlets (6). In addition, 62 kg/h of a pyrogenic silica (BET surface area 150 m$^2$/g) are metered into the mixing turbine (1) via a screw (7). The mixing turbine (1) is operated at a rotational speed of 1,400 rpm.

The raw mixture is transferred to the reciprocating single-screw kneader (2) via inlet (17). Gases are taken off from the RTV-1 composition via the port (18).

The degassed raw mixture is transferred to the dynamic mixer (active mixer) (4) via inlet (19). There, 0.08 kg/h of an Sn catalyst (catalyst SK from Wacker-Chemie GmbH, Munich) and 16 kg/h of a 50% strength paste of carbon black in silicone oil are metered in via inlet (20).

The RTV-1 composition obtained has stable properties and displays color parameters according to the CIE-Lab system of L*: 22, a*: 0.0 and b*: −0.3.

EXAMPLE 3b
Process Equipment Diagram Shown in FIG. 3

As in Example 3a, a raw mixture is prepared in the mixing turbine (1) and the reciprocating single-screw kneader (2) degassed and transferred to the dynamic mixer (active mixer) (4) via inlet (19). There, 0.08 kg/h of an Sn catalyst (catalyst SK from Wacker-Chemie GmbH, Munich) and 24 kg/h of a 50% strength paste of titanium dioxide in silicone oil are metered in via inlet (20).

The RTV-1 composition obtained has stable properties and displays color parameters according to the CIE-Lab system of L*: 96.5, a*: −0.5 and b*: 1.0.

EXAMPLE 3c
Process Equipment Diagram Shown in FIG. 3

Firstly, a black RTV-1 composition is prepared as described in Example 3a. A change is then made directly to the formulation of Example 3b. Subsequently, 10 kg are run through the dynamic mixer (active mixer) (4) in each of five steps. In each step, the product is stirred in the dynamic mixer (active mixer) (4) at maximum revolutions for 4–5 minutes. After 20 minutes, the RTV-1 composition has the color parameters of Example 3b. The amount of scrap is only 50 kg.

Figure 4:
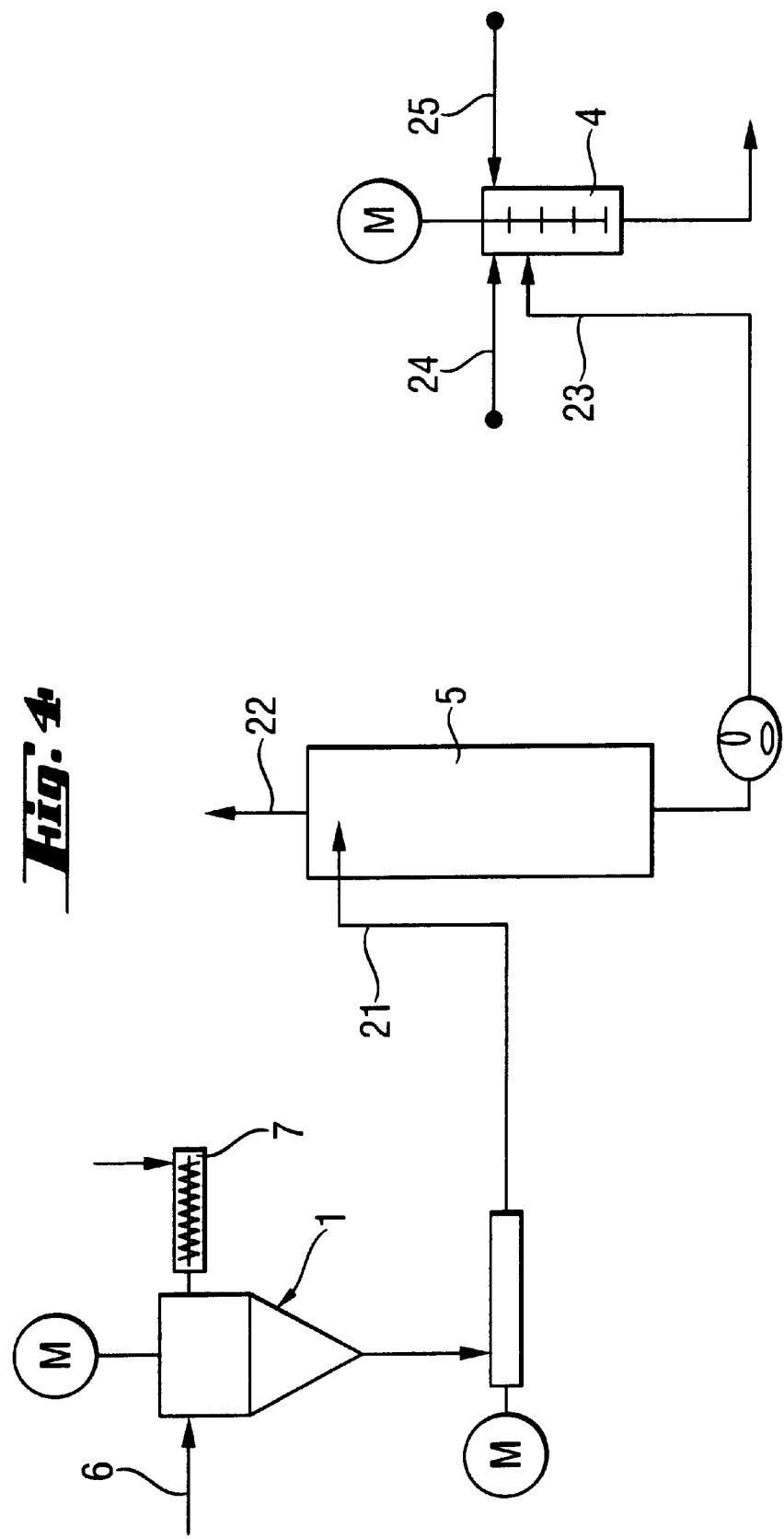
FIG. 4 Process equipment diagram (according to the invention): Mixing turbine (1)/vented kneader (5)/dynamic mixer (4)

EXAMPLE 4a
Process Equipment Diagram Shown in FIG. 4

730 kg/h of a mixture of 71% of an α,ω-dihydroxypolydimethylsiloxane (viscosity 80,000 mm$^2$/s), 23.5% of an α,ω-bis(trimethylsiloxy)polydimethylsiloxane (viscosity 100 mm$^2$/s) and 5.5% of a mixture of oligomeric acetoxysilanes (crosslinker ES 24 from Wacker-Chemie GmbH, Munich) are metered into the mixing turbine (1) via the inlets (6). In addition, 62 kg/h of a pyrogenic silica (BET surface area 150 m$^2$/g) are metered into the mixing turbine (1) via a screw (7). The mixing turbine (1) is operated at a rotational speed of 1400 rpm.

The raw mixture is transferred to the vented kneader (5) via inlet (21). Gases are taken off from the RTV-1 composition via the port (22).

The degassed raw mixture is transferred to the dynamic mixer (active mixer) (4) via inlet (23). There, 0.08 kg/h of an Sn catalyst (catalyst SK from Wacker-Chemie GmbH, Munich) is metered in via inlet (24) and 16 kg/h of a 50% strength paste of carbon black in silicone oil are metered in via inlet (25).

The RTV-1 composition obtained has stable properties and displays color parameters according to the CIE-Lab system of L*: 22, a*: 0.0 and b*: −0.3.

EXAMPLE 4b
Process Equipment Diagram Shown in FIG. 3

As in Example 4a, a raw mixture is prepared in the mixing turbine (1) and the vented kneader (5), degassed and transferred to the dynamic mixer (active mixer) (4) via inlet (23). There, 0.08 kg/h of an Sn catalyst (catalyst SK from Wacker-Chemie GmbH, Munich) is metered in via inlet (24) and 24 kg/h of a 50% strength paste of titanium dioxide in silicone oil are metered in via inlet (25).

The RTV-1 composition obtained has stable properties and displays color parameters according to the CIE-Lab system of L*: 96.5, a*: −0.5 and b*: 1.0.

EXAMPLE 4c
Process Equipment Diagram Shown in FIG. 4

Firstly, a black RTV-1 composition is prepared as described in Example 4a. A change is then made directly to the formulation of Example 4b. 10 kg are then run through the dynamic mixer (active mixer) (4) in each of 5 steps. In each step, the product is stirred in the dynamic mixer (active mixer) (4) at maximum revolutions for 4–5 minutes. After 20 minutes, the RTV-1 composition has the color parameters of Example 4b. The amount of scrap is only 50 kg.

EXAMPLE 5a

Process Equipment Diagram Shown in FIG. 3

705 kg/h of a mixture consisting of in turn 80% of a premix which comprises 61% of α,ω-dihydroxypolydimethylsiloxane (viscosity 350,000 mm²/s), 37% of α,ω-bis(trimethylsiloxy)polydimethylsiloxane (viscosity 100 mm²/s) and 2% of 3-(cyclohexylamino)propyltrimethoxysilane and had been stored for at least one day at RT, and 16% of an α,ω-bis(trimethylsiloxy)polydimethylsiloxane (viscosity 100 mm²/s) and 4% of crosslinker ET 14 (from Wacker-Chemie GmbH, Munich) are metered into the mixing turbine (1) via the inlets (6). In addition, 67 kg/h of a pyrogenic silica (BET surface area 150 m²/g) are metered into the mixing turbine (1) via a screw (7). The mixing turbine (1) is operated at a rotational speed of 1,400 rpm.

The raw mixture is transferred to the reciprocating single-screw kneader (2) via inlet (17). There, 8.0 kg/h of an Sn catalyst (catalyst A 42 from Wacker-Chemie GmbH, Munich) are metered in via inlet (26). Gases are taken off from the RTV-1 composition via the port (18).

The degassed raw mixture is transferred to the dynamic mixer (active mixer) (4) via inlet (19). There, 16 kg/h of an aminopropyltriethoxysilane, 3.6 kg/h of an N-(3-(trimethoxysilyl)propyl)ethylenediamine and 16 kg/h of a 50% strength paste of carbon black in silicone oil are metered in via inlets (20).

The RTV-1 composition obtained has stable properties and displays color parameters according to the CIE-Lab system of L*: 22, a*: 0.0 and b*: −0.3.

What is claimed is:

1. A three-stage process for the continuous preparation of RTV-1 organopolysiloxane compositions, which comprises, in a first step, preparing a raw mixture of α,ω-dihydroxypolydiorganosiloxane, filler and, if desired, further constituents, in a second step, freeing the raw mixture of gas inclusions under reduced pressure and, if desired, mixing the raw mixture with further constituents to form a degassed raw mixture and, in a third step, mixing the degassed raw mixture with an additional component comprising one or more of a crosslinker, a condensation catalyst, or a further constituent, said additional component causing the product obtained from said third step to be different from the product obtained from said second step.

2. The process as claimed in claim 1, wherein continuous closed mechanical mixers and/or kneaders are used in the first step.

3. The process as claimed in claim 1, wherein vacuum vented kneaders or degassing apparatuses are used in the second step.

4. The process as claimed in claim 2, wherein vacuum vented kneaders or degassing apparatuses are used in the second step.

5. The process as claimed in claim 1, wherein dynamic mixers are used in the third step.

6. The process as claimed in claim 2, wherein dynamic mixers are used in the third step.

7. The process as claimed in claim 3, wherein dynamic mixers are used in the third step.

8. The process as claimed in claim 4, wherein dynamic mixers are used in the third step.

9. The process as claimed in claim 1, wherein static mixers are used in the third step.

10. The process of claim 1, wherein the RTV-1 composition is a colored composition and wherein said color is imparted by a pigment which is added to the composition in said third step.

11. The process of claim 10 wherein said color is white.

12. A process for successively preparing first and second RTV-1 organopolysiloxanes having different compositional specifications, in process equipment without cleaning said process equipment between preparation of the successively prepared RTV-1 organopolysiloxanes while minimizing waste RTV-1 organopolysiloxanes produced following production of said first RTV-1 organopolysiloxane prior to meeting the compositional specifications of said second RTV-1 organopolysiloxane, said process comprising:

(a) in a first step, preparing a raw mixture of α,ω-dihydroxypolydiorganosiloxane, filler and, if desired, further constituents; in a second step, freeing the raw mixture of gas inclusions under reduced pressure and, if desired, mixing the raw mixture with further constituents to form a degassed raw mixture; and, in a third step, mixing the degassed raw mixture with one or more of a crosslinker, a condensation catalyst and optionally additional constituents and recovering a first RTV-1 composition;

(b) substantially maintaining the amounts and types of constituents added during said first step and said second step of (a);

(c) altering the amount(s) and or type(s) of constituents added during said third step;

(d) obtaining a byproduct fraction with compositional specifications intermediate said first and said second RTV-1 organopolysiloxanes until the compositional specifications of said byproduct fraction meet the compositional specification of said second RTV-1 organopolysiloxane; and (e) recovering a second RTV-1 organopolysiloxane, wherein the amount of byproduct produced in step (d) is less than that obtained when no third step is practiced, and the components added during said third step are instead added during one or both of said first step and said second step.

13. The process of claim 12, wherein said different first and said second RTV-1 compositions have different color parameter specifications.

14. The process of claim 12, wherein said different first and second RTV-1 compositions have different catalyst and/or crosslinker parameter specifications.

* * * * *